(12) United States Patent
Malone (10) Patent No.: US 6,626,585 B1
(45) Date of Patent: Sep. 30, 2003

(54) SUBASSEMBLY FOR PASSIVELY ALIGNING AN OPTICAL FIBER WITH A VCSEL AND METHOD OF MANUFACTURING THE SAME

(75) Inventor: Kevin Malone, Broomfield, CO (US)

(73) Assignee: Optical Communication Products, Inc., Chatsworth, CA (US)

(*) Notice: Subject to any disclaimer, the term of this patent is extended or adjusted under 35 U.S.C. 154(b) by 0 days.

(21) Appl. No.: 10/082,504

(22) Filed: Oct. 19, 2001

Related U.S. Application Data

(60) Provisional application No. 60/249,315, filed on Nov. 16, 2000.

(51) Int. Cl.$^7$ .................................................. G02B 6/36
(52) U.S. Cl. ............................ 385/88; 385/89; 385/92; 385/93
(58) Field of Search ........................ 385/88, 89, 90, 385/91, 92, 93, 94, 59, 71, 17; 364/1.25; 372/50, 36, 45

(56) References Cited

U.S. PATENT DOCUMENTS 5,257,336 A * 10/1993 Dautartas ..................... 385/93
5,631,987 A *  5/1997 Lasky et al. .................. 385/88

* cited by examiner

*Primary Examiner*—Phan T. H. Palmer
(74) *Attorney, Agent, or Firm*—Barlow, Josephs & Holmes, Ltd.

(57) ABSTRACT

An optical subassembly configured to passively align an optical fiber with an optical device. The optical subassembly including a submount having a guide hole with a first tapered portion for guiding an optical fiber into a second portion of substantially constant cross section, wherein the second portion aligns the optical fiber with the optical device.

27 Claims, 9 Drawing Sheets

SUBASSEMBLY FOR PASSIVELY ALIGNING AN OPTICAL FIBER WITH A VCSEL AND METHOD OF MANUFACTURING THE SAME

CROSS-REFERENCE TO RELATED APPLICATION

This application claims priority of U.S. provisional application Ser. No. 60/249,315 entitled "Subassembly for Passively Aligning Fiber with a VCSEL and a Method for Manufacturing the Same," filed Nov. 16, 2000, the contents of which are incorporated herein by reference.

BACKGROUND OF THE INVENTION

This invention relates generally to optical subassemblies and more particularly to optical subassemblies for passively aligning optical devices to optical fibers.

Optical devices are widely utilized in modern high speed telecommunication networks for reasons including, but not limited to, their very high bandwidth capabilities. Light transmitted by fiber optic cable is, in most instances, produced by a light emitting semiconductor device, such as a vertical cavity surface emitting laser (VCSEL). These devices must be aligned and optically coupled to an end face of the fiber optic cable. The most common alignment process is active alignment, whereby the optical source is aligned to the optical fiber by detecting and maximizing the light coupled into the optical fiber. Active alignment is time consuming and therefore costly. Thus, efforts have been made to produce optical subassemblies that passively align with the optical fibers. The general goals of passively aligned optical sub assemblies are to achieve high coupling efficiency (i.e., low loss of light from the coupling), ease of assembly, and comparatively low cost with respect to actively aligned devices.

Alignment difficulties are introduced by characteristics of both the fiber and the optical device. The core of a typical fiber optic cable is quite small. For example, the core diameter for a single mode fiber is approximately 9 micrometers. Semiconductor lasers typically emit light with elliptical beams in the range of approximately 2–20 micrometers. Difficulties arise in aligning or focusing the laser beam in the fiber. Alignment of the laser and the fiber is critical in order to maximize coupling efficiency, i.e., produce the maximum transmission of light from the laser into the fiber. Misalignment of as little as two micrometers between the optical device and the optical fiber can significantly reduce the optical coupling efficiency.

As stated, the traditional method for coupling an optical fiber to an optoelectronic device utilizes active alignment. For example to couple a VCSEL to an optical fiber by active alignment, the laser is first turned on to emit optical radiation. A coupling end of the optical fiber is then placed near a light emitting surface of the laser to receive optical radiation, and a photodetector is placed at the other end of the fiber to detect the amount of optical radiation that is coupled into the fiber. The position of the coupling end of the fiber is then manipulated manually around the light-emitting surface of the laser until the photodetector at the other end of the fiber detects maximum optical radiation. Optical epoxy is then applied to both the laser and the coupling end of the fiber so as to permanently maintain the optimized coupling. It will be appreciated that the time and labor needed to align the optical device with the optical fiber adds considerable cost to the manufacturing process and limits high volume production of optical components. To avoid the aforementioned problems, a passive alignment approach in which no alignment adjustments are required is generally preferred.

Figures 1, 2:
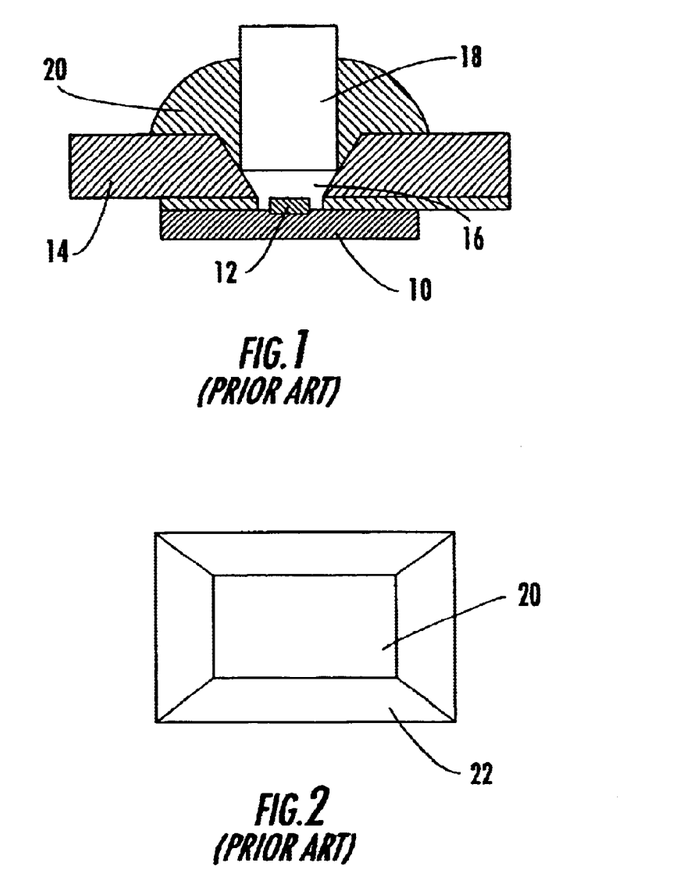
FIG. 1 is a sectional view of an optical subassembly having a guide hole with sloped sidewalls for passively aligning a conventional optical fiber and an optical device.
FIG. 2 is a top view of the optical subassembly of FIG. 1, wherein the upper surface has a large square aperture, and the lower surface has a smaller square aperture.

In this regard, some prior art assemblies which employ mechanical positioning approaches aimed at eliminating or reducing the need for active alignment have been developed. One such approach is disclosed in U.S. Pat. No. 5,434,939, issued to Matsuda. As shown in FIG. 1, a VCSEL 10 is formed on a light-emitting chip 12. The light-emitting chip 12 is attached to a monocrystalline silicon (Si) submount 14 which is etched, typically with an anisotropic etchant, to form a guide hole 16. Typically, the light-emitting chip and the submount are self-aligned so that the positions of the VCSEL, and the guide hole, are adjusted. Next, an optical fiber 18 is inserted into the guide hole and fixed with UV cured epoxy 20, which results in the final alignment between the VCSEL and the optical fiber.

Referring to FIG. 2, the guide hole 16 of Matsuda has a much larger outer aperture 22, typically on the order of 870 micrometers than the inner aperture 20, which is typically on the order of the fiber diameter of about 125 micrometers. Thus, the fiber 18 is relatively free to move in all directions within the guide hole. Therefore, the forces normally exerted upon the fiber during the epoxy cure cycle can readily cause misalignment between the fiber and the VCSEL. Thus, there remains room for improvement in the art.

What is needed is a method and apparatus for automatic passive alignment of fiber optic cables or optical waveguides with optoelectronic devices that does not require time consuming and labor intensive manual active alignment, and is less susceptible to misalignment during assembly.

SUMMARY OF THE INVENTION

An exemplary embodiment of the optical subassembly of the present invention includes a silicon submount mated to a substrate carrying an optoelectronic device, such as a VCSEL, where the submount passively aligns an optical fiber with the optoelectronic device. The submount includes first and second sides with a midpoint therebetween. A guide hole extends through the first and second sides, where the guide hole includes a first guiding or tapered portion which extends from the first side to about the midpoint of the submount. The tapered portion serves to guide an optical fiber into the hole. The hole also includes a close tolerance or second alignment portion of substantially constant cross section that extends from the midpoint to the second side of the hole. The second portion serves to align the optical fiber with an optical device. Generally, the submount includes on its second side a number of metal deposits for joining the submount, via solder balls, to mating metal deposits formed on a ceramic substrate. The ceramic substrate includes an optoelectronic which is centered with respect to the hole in the submount.

In additional embodiments, the optical subassembly may include a submount having a plurality of guide holes wherein each of the guide holes has a first tapered portion for guiding one of a plurality of optical fibers into a second portion of substantially constant cross section where each of the plurality of optical fibers is aligned with a corresponding optoelectronic device.

The method for fabricating the optical subassembly of the present invention is, in general, as follows. Initially, a silicon nitride layer is grown on both the first and second sides of a double sided polished silicon wafer of predetermined dimensions. A photoresist layer is deposited, or spun as the process is commonly referred to, on the first side of the wafer. The photoresist is then selectively removed to form a void pattern on the silicon nitride layer in the first side of the wafer. The exposed nitride layer is selectively removed with an etchant to form another coextensive void pattern on the exposed silicon in the silicon nitride layer. Next the photoresist layer is removed. Subsequently, the exposed silicon is etched with an anisotropic etchant to form the first tapered portion of the guide hole for the fiber optic cable. At this point, the remaining nitride is removed from both the first and second sides of the silicon wafer and the wafer is flipped over and a new layer of photoresist is spun onto the second side of the wafer.

Portions of the second side photoresist layer are selectively removed, preferably using liftoff processing, to form a void pattern on the second side of the silicon wafer. A conductive metal layer is then deposited on the second side of the wafer. The metal layer covers the photoresist and fills the void pattern adhering to the exposed silicon. Subsequently, the photoresist is stripped away and along with it that portion of the metal layer deposited on the photoresist. What is left is a metal pattern on the wafer occupying the former void pattern in the photoresist. In the exemplary embodiment, the metal pattern is a number of contact or connection pads. A final silicon nitride layer is grown over the second side of the wafer and is again selectively removed to form any desired features such as scratch resistant surfaces in the vicinity of the metal pads. An additional layer of thick photoresist is now spun over the second side of the wafer. This layer is again selectively removed to form a void defining the perimeter of the close tolerance second portion of the fiber guide hole. The second side of the wafer is now etched using a deep reactive ion etching process to form the close tolerance second portion of the fiber guide hole in the wafer. Removal of the remaining thick photoresist layer completes the fabrication of the optical submount. The optical subassembly is then completed by joining the submount to a substrate containing an optoelectronic device. Suitable optoelectronic devices include VCSELs, light emitting diodes, and photodetectors among others. These and other features of the invention will become more apparent from the following detailed description of the invention, when taken in conjunction with the accompanying exemplary drawings.

DETAILED DESCRIPTION OF THE INVENTION

Figure 4:
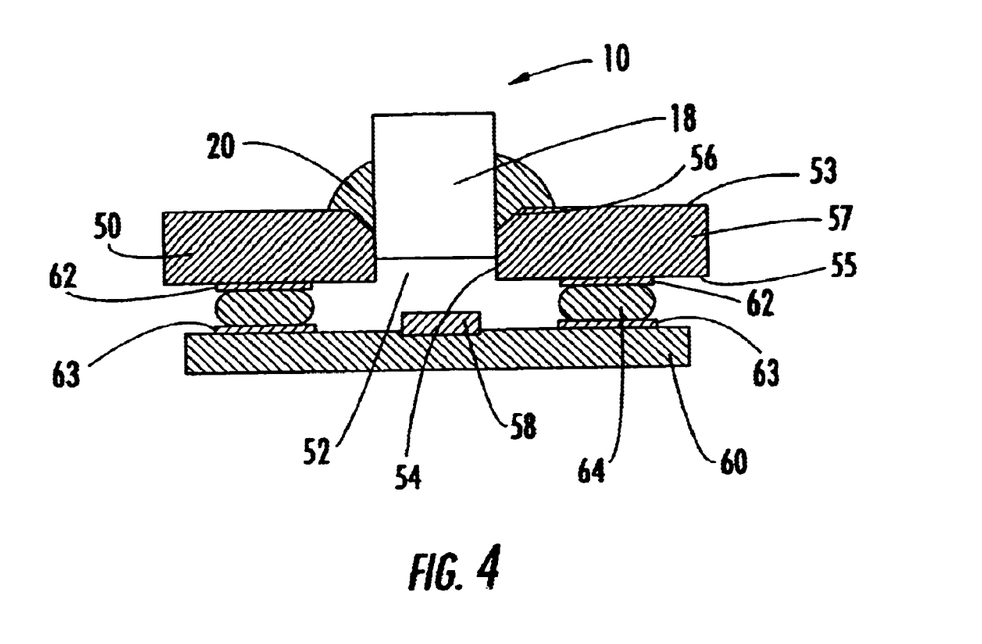
FIG. 4 is a sectional view of an optical subassembly having a guide hole with a first portion having sloped side walls for guiding an optical fiber into the hole and a second close tolerance portion, of substantially constant cross-section, for passively aligning the optical fiber and an optical device.

With reference to FIG. 4, the present invention optical subassembly 10 provides for the high volume production of optical components at low cost. The optical subassembly includes a submount 50, which has a guide hole 52 for aligning an optical fiber 18 with an optoelectronic device 58. The optoelectronic device is formed or mounted on a substrate 60. Deposited on both the submount 50 and the substrate 60 are a plurality of axially spaced, mutually opposed, metal pads 62 and 63 respectively. The submount and the substrate are joined via solder balls 64 at the metal pads. In the completed assembly, the optical fiber is held in place in the guide hole via optical epoxy 20.

In the exemplary embodiment, the submount 50 is fabricated from a double sided, polished, monocrystalline silicon (Si) wafer. However, other materials may be used and are known in the art. The submount includes a first side 53 and a second side 55, with a wafer midpoint 57 therebetween. The submount additionally includes the guide hole 52 for the receipt of the optical fiber 18. The guide hole includes a first guiding portion or first tapered portion 56 which extends from the first side to about the wafer midpoint. The first tapered portion serves to guide the optical fiber into the guide hole. Due to the crystallography of Silicon, the tapered portion will typically have sidewalls with a slope on the order of about 54.7 degrees. The guide hole also includes a second alignment portion or close tolerance second portion 54 of substantially constant cross section that extends from the wafer midpoint to the surface of the second side. The close tolerance second portion serves to align the optical fiber with an optoelectronic device 58. In the exemplary embodiment, the cross section of the second portion is substantially circular, though other profiles may be used. The diameter of the second portion 54 is about the same as the outer diameter of an optical fiber, which is typically about 125 micrometers. Preferably, the sidewalls of the second portion are sloped less than 1 degree from vertical.

With continued reference to FIG. 4, the plurality of metal deposits formed on the submount 50 and substrate 60 may be any of several conductive metals. Suitable metals include Ti, Au, or In, and alloys thereof, among others. The metal deposits 62 are preferably photolithographically deposited on the submount 50 and the substrate 60 to allow the substrate and the submount to self align with respect to each other via the self centering action of the solder balls 64 used to join the respective metal pads. The spacing of the metal pads on the submount 50 and the substrate 60 is controlled such that when self alignment occurs, the optoelectronic device 58 will be substantially centrally aligned with the longitudinal axis of the guide hole 52.

The optical device 58 of the present invention is preferably a VCSEL, realized with standard VCSEL manufacturing techniques. The VCSEL preferably includes first or lower mirror layers, an optical cavity, and a second or upper mirror epitaxially grown in the substrate 60. The substrate 60 may be made of gallium arsenide (GaAs) or any other suitable material. The first and second mirrors are comprised of multilayered distributed Bragg reflectors, (DBRs) as is conventional in the art. Aluminum gallium arsenide (AlGaAs) and aluminum arsenide (AlAs), with varying concentrations of aluminum and gallium may be used to fabricate the upper and lower mirrors.

The optical thickness of each mirror layer is preferably designed to be a quarter wavelength of the emitted light of the VECSEL where the optical thickness is given by the product of the physical thickness and the index of refraction. The optical cavity preferably includes an active region surrounded by first and second cladding regions. The first and second cladding regions are made of AlGaAs in the exemplary embodiment. In the active region, at least one quantum well made of GaAs is disposed on adjacent barrier layers made of $Al_{0.25}Ga_{0.75}As$. One of skill in the art will appreciate that the present invention is not limited to a VCSEL as set forth above. The construction and materials used in forming the VCSEL will very depending the particular application.

Figure 5A:
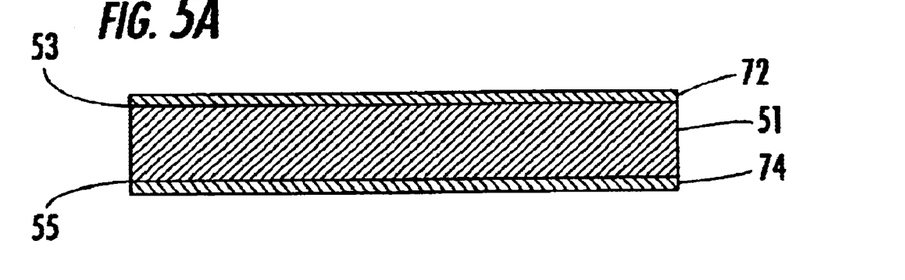
FIGS. 5A–S are sectional views illustrating a method for fabricating an optical subassembly for passively aligning an optical fiber and optical device in accordance with an exemplary embodiment of the present invention.

An exemplary manufacturing process for producing the optical subassembly depicted in FIG. 4 will now be described. Referring now to FIG. 5A, the submount 50 is formed from a double sided, polished silicon <100> wafer 51. For clarity, the wafer, like the submount, will be referred to as having first and second side 53 and 55 respectively. The wafer is cleaned using any conventional silicon wafer cleaning process. The wafer is preferably on the order of about 525 micrometers thick. First and second silicon nitride ($Si_3N_4$) layers 72 and 74, preferably 0.1 micrometers thick, are grown on the first and second sides 53 and 55 of the silicon wafer by known techniques. One suitable technique is low-pressure chemical vapor deposition (LPCVD). In this process, gaseous silane ($SiH_4$) is reacted with ammonia ($NH_4$) in a furnace at about 600 to 900° C. Another suitable method for growing silicon nitride layers is plasma-enhanced chemical vapor deposition (PECVD) using radio frequency energy. Once grown, the first and second silicon nitride layers act as a mask for wet chemical etching of the tapered portion 56 of the guide hole 52. Other materials including silicon dioxide ($SiO_2$) can also be used as the masking material.

Figure 5B:
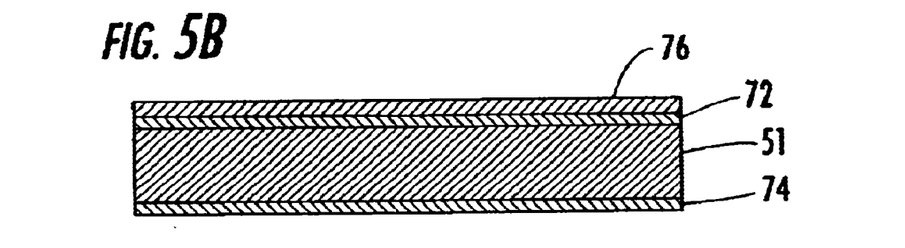
Figure 5C:
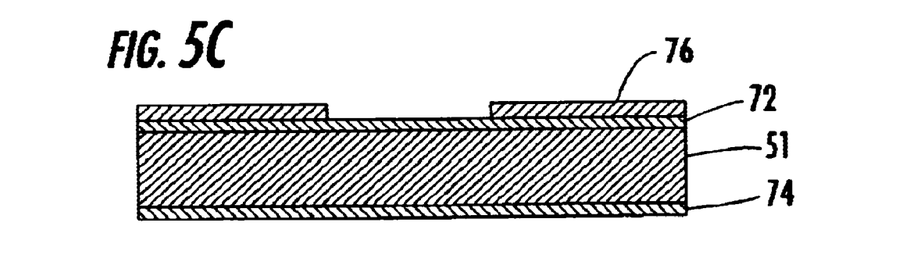

Referring now to FIG. SB, the upper silicon nitride layer 72 is preferably uniformly coated with a thin film or layer 76 of photosensitive material commonly referred to as photoresist. A desired pattern to be formed on the photoresist layer may be formed in a chrome-on-glass photomask using known techniques. The pattern on the photomask is then transferred to the photoresist by known optical techniques. As shown in FIG. SC, the photoresist pattern is then developed to create a void pattern in the photoresist which exposes selected portions of the first silicon nitride $Si_3N_4$ layer 72. In the exemplary embodiment, the void pattern of FIG. 5C is a square. However, other patterns are suitable.

Figure 5D:
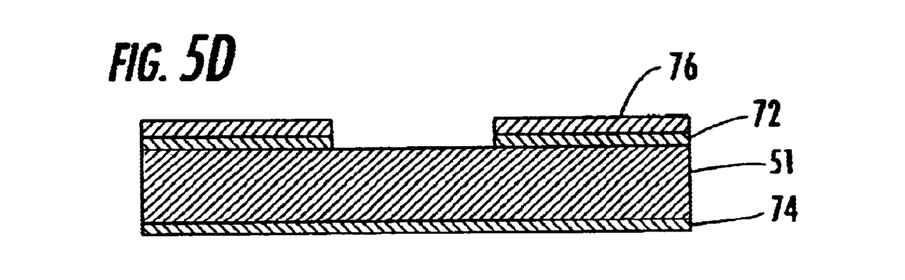

Referring now to FIG. SD, the first $Si_3N_4$ layer 72 is preferably wet etched with a suitable etchant such as hydrofluoric acid (HF), or phosphoric acid ($H_3PO_4$), to create a void pattern in the first nitride layer 72, thereby exposing a portion of the silicon wafer 51. Wet etching as is known in the art and employs wet chemical processes to etch lines and features. These techniques utilize the difference between the etch rate of the photoresist masking layer 76 and the $Si_3N_4$ layer 72 to control the etch pattern. If necessary, Teflon wafer holders, or other techniques known to those of skill in the art, may be used to protect the exposed silicon nitride layer 74 on the back side of the wafer when etching the silicon nitride layer 72 on the front side of the wafer.

Figure 5E:
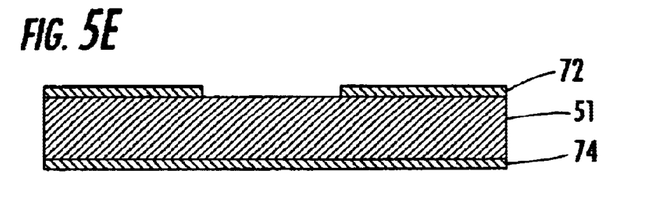

With reference to FIG. 5E, the photo resist layer 76 is removed from the remaining silicon nitride layer 72 using a standard solvent, such as acetone. The silicon wafer 51 is subsequently wet etched with an anisotropic etchant such as potassium hydroxide (KOH), ethylene diamine pyrocatechol (EDP), or tetramethyl ammonium hydroxide (TMAH). In isotropic etching the etchant attacks the crystal equally in all directions without regard to the different densities of atoms and structural features in the different directions in a crystal. Anisotropic etching, on the other hand, takes advantage of different reactivities of the different crystal planes due to bonding and density differences.

Figure 5F:
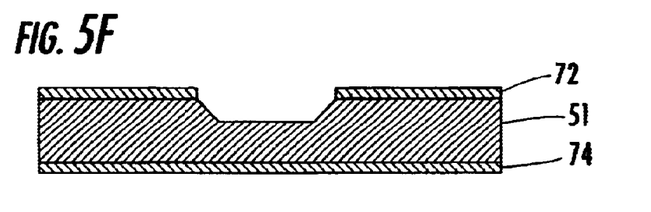

Referring now to FIG. 5F, in the exemplary embodiment, the KOH etchant only etches the <100> plane of the silicon wafer resulting in the sloped sidewall or first tapered portion 56 of the guide hole 52. The thickness of the photo resist layer used to create the desired silicon nitride mask opening, may be determined based upon the desired maximum depth of the etch, and the known angle the etch will create, i.e., 54.7 degrees.

Figure 5G:
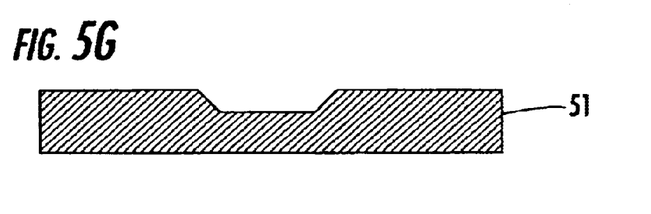

Referring to FIG. 5G, the first and second $Si_3N_4$ layers, 72 and 74, are removed by an etchant such as hydrofluoric acid (HF) or phosphoric acid ($H_3PO_4$) leaving the bare wafer 51 with the first tapered portion 56 of the guide hole 52 formed therein.

Figure 5H:
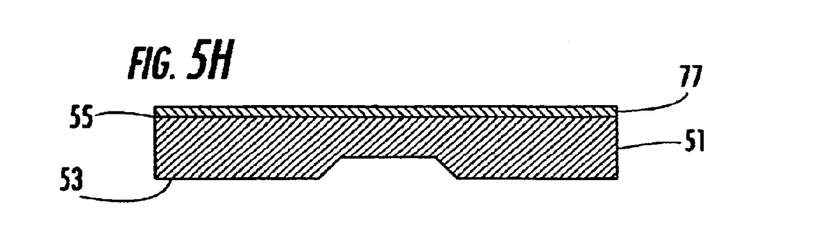
Figure 5I:
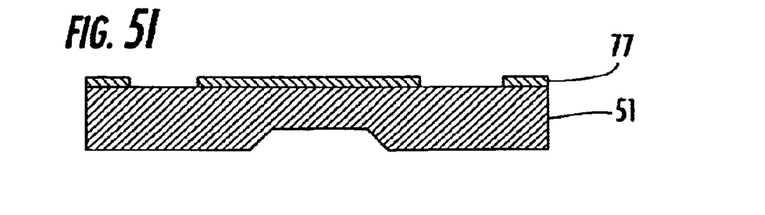

Referring now to FIG. 5H, the double-side polished silicon wafer 51 is turned over and the second side 55 of the wafer is uniformly coated with a thin film or layer 77 of photoresist. A desired pattern is formed in a photomask and the photomask pattern is transferred to the photoresist. As shown in FIG. 5I, the photoresist is then developed to create a void pattern in the photoresist which exposes selected portions of the silicon wafer. In the exemplary embodiment, the pattern is a pattern of squares which is used to form the metallized pads 62 of the submount 50. The pattern is preferably photolithographically positioned with respect to the intended position of the guide hole 52.

Figure 5J:
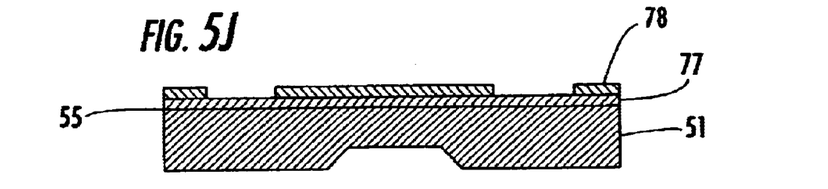

Referring to FIG. 5J, a metal layer 78 is then deposited onto the second side 55 of the silicon wafer 51. The metal layer covers the photoresist layer 77, and fills in the void pattern in the photoresist, thereby covering and adhering to the exposed portions of the second side of the wafer. Typically, the metal layer will consist of two distinct films of conductive materials such as titanium/gold, chromium/copper and others. For example, in a titanium/gold composition, the titanium is first laid down as a thin film and functions as an adhesive layer between the silicon wafer and the comparatively thicker gold film which is subsequently deposited over the titanium. Gold is chosen as the outer film for its excellent thermal and electrical properties. The use of a metal adhesion layer between a substrate and a conductive metal layer is well known in the art. The metal layer 78 may also be fashioned as a microwave transmission line in order to provide low-loss electrical signal propagation on the silicon substrate 70.

Figure 5K:
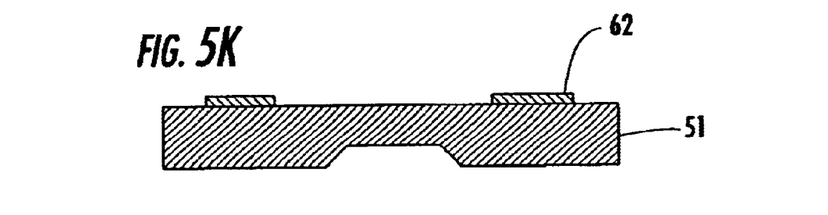

Referring now to FIG. 5K, in the exemplary embodiment, a lift-off processing technique is preferred for removing the photoresist layer 77 (FIG. 5J) and the metal layer deposited on top of it. After stripping away the photoresist layer and the overlying metal layer 78 (FIG. 5J), a bare wafer having the metal pads 62 adhered thereto is revealed. Although the metal pattern is preferably formed by lift-off processing in this step, a variety of other techniques, such as wet-chemical etching may be used to define the metal pattern.

Figure 5L:
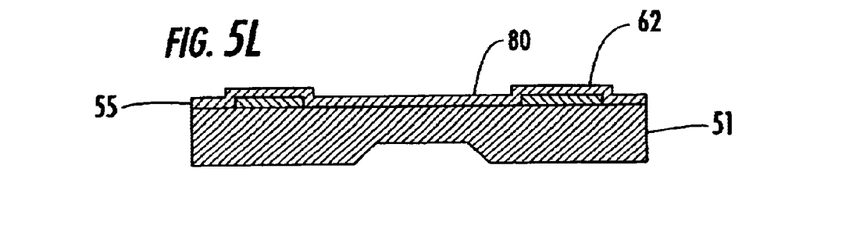

Referring to FIG. 5L, the second side 55 of the wafer 51, including the metal pads 62, is coated with a passivation layer 80 of silicon nitride ($Si_3N_4$) for the purpose of scratch protection and to allow the construction of structural features about the metal pads. This layer may be deposited by plasma-enhanced chemical vapor deposition (PECVD) or other techniques.

Figure 5M:
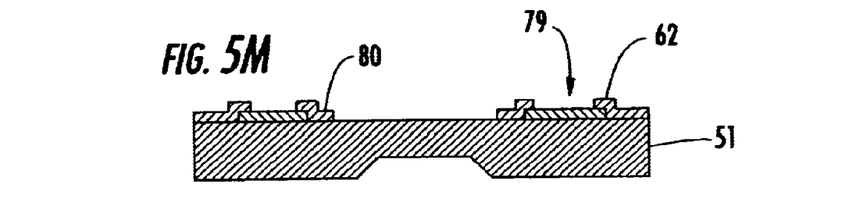

With reference to FIG. 5M, photolithographic techniques and wet etching may be used to open windows 79 in the silicon nitride ($Si_3N_4$) passivation layer 80. The windows form structural protection features about the metal pads 62 and expose a portion of the second side 55 of wafer in preparation for formation of the close tolerance second portion 54 of the guide hole 52.

Figure 5N:
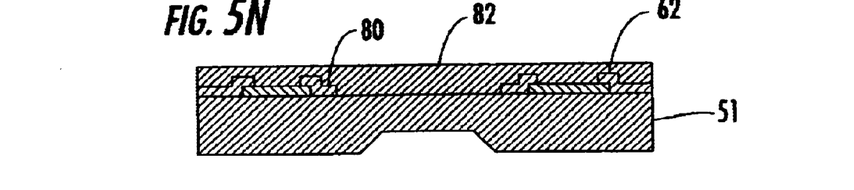
Figure 5O:
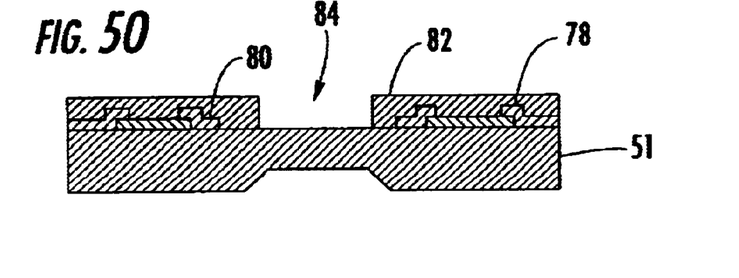

Referring now to FIG. 5N, a relatively thick photoresist layer 82 is uniformly coated onto the wafer 51. Photolithographic techniques are once again used to define an opening 84 (FIG. 5O) in the photoresist layer 82. In the exemplary embodiment, the opening 85 is generally circular. However, many other shapes such as square and triangular may be used.

Figure 5P:
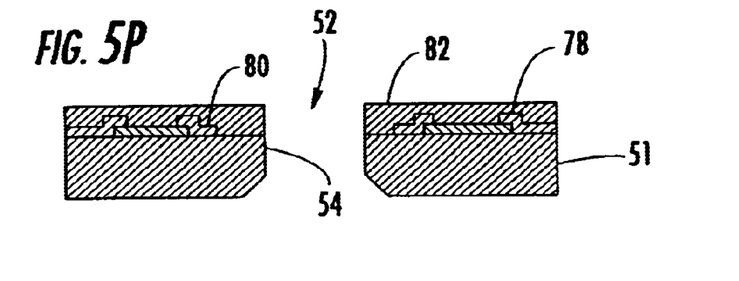

Referring to FIG. 5P, the generally circular opening 84 (FIG. O) in the photoresist layer 82 is then transferred to the silicon wafer 51 to form the second alignment portion 54 of the guide hole 52 using one of a number of known techniques, such as a reactive ion etching (RIE) process which is commonly used for anisotropic silicon plasma etching. Such a process is disclosed in U.S. Pat. No. 5,498,312, which is herein incorporated by reference in its entirety.

For plasma etching, the silicon wafer is placed within a processing chamber and in communication with an electrode. A gas mixture comprised of an etching gas and a passivating gas is introduced into the processing chamber. A plasma is formed above the masked silicon surface to be etched by adding large amounts of energy to the gas at low pressures. This is commonly accomplished with electromagnetic radiation in the form of microwave energy. The plasma contains ions, free radicals, and neutral species, all with high kinetic energies. By adjusting the electrical potential of the silicon substrate to be etched, the charged species in the plasma can be directed to impinge on the silicon substrate and thereby impact the non-masked regions. The force of the high-energy impact can knock out the silicon substrate atoms forming the second portion 54 of the guide hole 52 in the silicon wafer 51.

Figure 5Q:
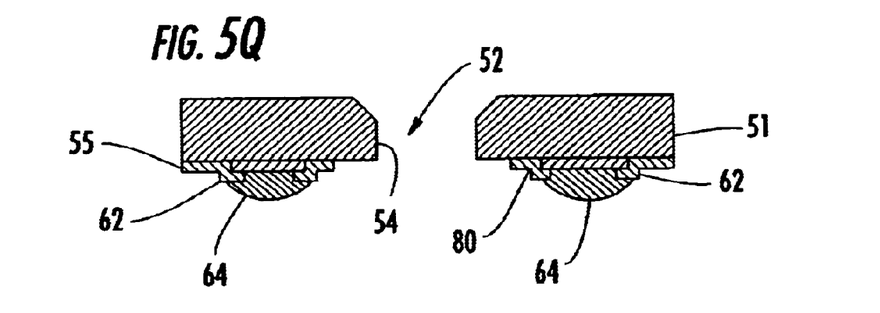

With reference to FIG. 5Q, the remaining photoresist 82 (FIG. 5P) may be removed with a number of standard solvents such as acetone. Subsequently, a layer of solder, preferably a lead-tin composite, or eutectic, is deposited on the second side 55 of the wafer 51. The solder layer is patterned by photolithography and etched to form solder balls 64 on top of the metal pads 62. At this point, the silicon wafer 51 has been effectively been transformed into the submount 50.

Figure 5R:
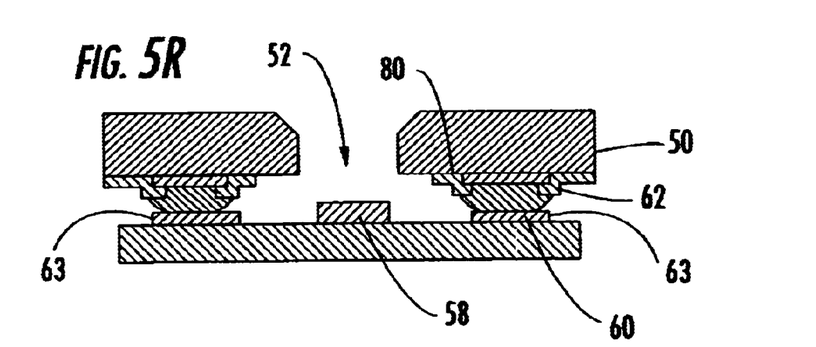

Referring now to FIG. 5R, metal pads 63 which are the mirror image of the metal pads 62 deposited on the silicon wafer 51, are deposited on the substrate 60 in a predetermined position relative to the optoelectronic device 58. Advantageously, the optoelectronic device may be self aligned to the guide hole 52 through a known process where the metal pads 63 deposited on the optoelectronic device substrate are first coarsely aligned with the metal pads 62 on the silicon submount 50. Heat is then applied to melt or reflow the solder balls, preferably in a nitrogen-purged furnace. The solder is confined between the metal pads 62 and 63 and does not flow laterally beyond the pads. A surface tension is created in the solder, which self aligns the metal pads. Due to the controlled spacing of the optoelectronic device and the guide hole, the optoelectronic device will be longitudinally centered in the guide hole, during the solder reflow process. When the heat is removed, the solder cools down and the self-alignment process is completed.

Figure 5S:
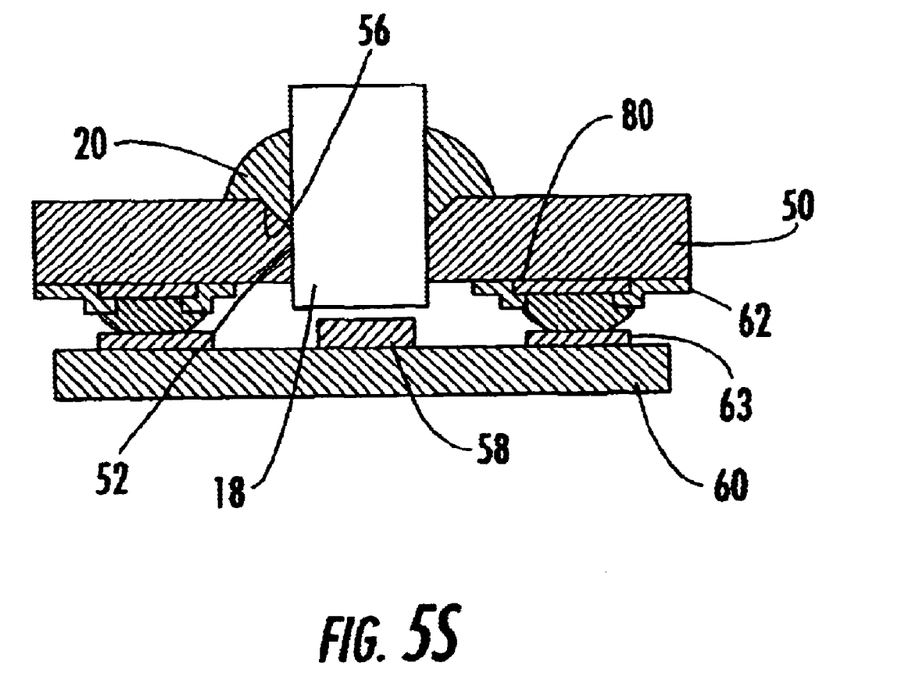

Referring to FIG. 5S, the optical fiber 18 (single or multi-mode) may then be easily installed within the first portion 56 of the guide hole 52, acting to guide the fiber into the second portion 54 of substantially constant circular cross-section. The second circular portion of the guide hole then accurately aligns the fiber with the optoelectronic device 58 and restricts the fiber from moving during assembly. An optical epoxy 20 preferably bonds the fiber in place.

Figure 6:
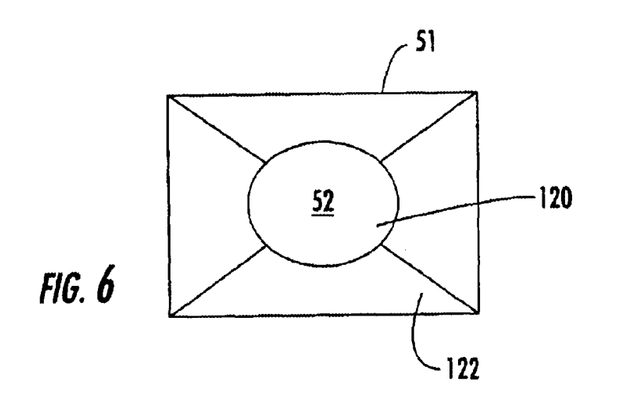
FIG. 6 is a top view of the optical subassembly of FIG. 4, wherein the upper surface has, a large square aperture, and the lower surface has a smaller circular aperture in accordance with an exemplary embodiment of the present invention.
Figures 7A, 7B:
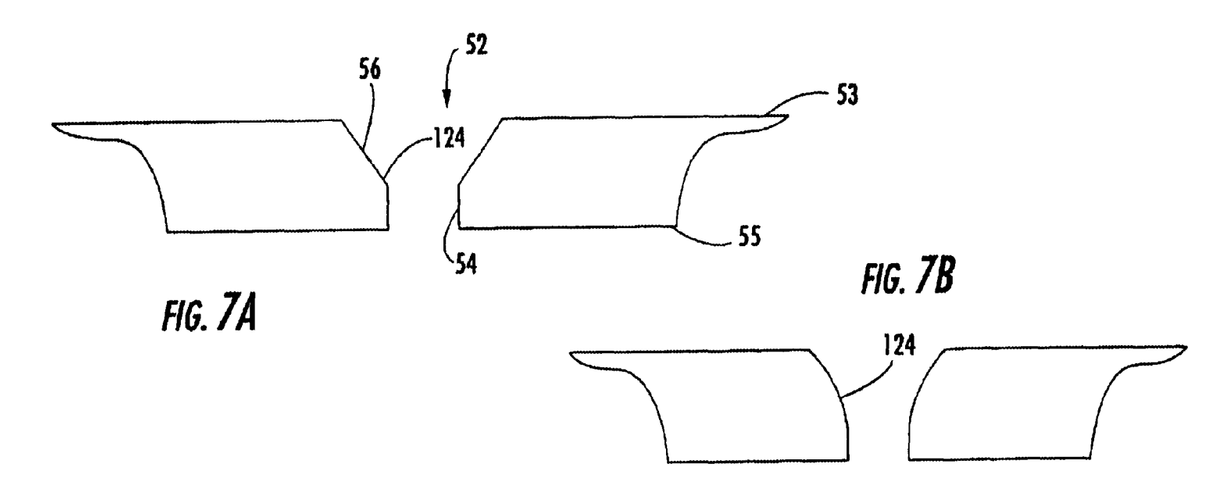
FIG. 7A is sectional view of an optical assembly wherein a discontinuity may be formed at the intersection of the first guide hole portion having a square cross section with sloped side walls and a second guide hole portion having a circular cross section in accordance with an exemplary embodiment of the present invention.
FIG. 7B is a sectional view of an alternate embodiment wherein a controlled erosion etch may be used to smooth the discontinuity created at the intersection of the first guide hole portion having a square cross section with sloped side walls and a second guide hole portion having a circular cross section in accordance with a preferred embodiment of the present invention.

Referring now to FIGS. 6 and 7A, in the preferred embodiment, a square pattern is created on the upper surface of the silicon wafer 51. Therefore, the guide hole 52 transitions from a generally circular aperture 120 on the second side 55 of the silicon wafer to a square aperture 122 on the first side 53. As a result, there may be discontinuities or sharp edges 124 created by the intersection of the circular and square sections of the guide hole.

With reference to FIG. 7B, as an optional step, the sharp edges 124 may be softened or rounded out, by subjecting the region to an isotropic etchant used in conjunction with a controlled erosion mask. By varying the thickness or density of the mask, a degree of erosion selectivity may be achieved.

In a further embodiment, the present invention may be extended to interconnect multiple optical fibers in a fiber cable or array with an array of optoelectronic devices monolithically formed on a semiconductor chip. The optoelectronic devices may be light emitting diodes (LEDs), VCSELs, other surface emitting devices, photo-detectors, and combinations thereof. For example, a back emitting VCSEL may be combined with a photodector for the purpose of monitoring the output of the VCSEL. Further, the optoelectronic devices may be integrated with drive circuitry monolithically formed on the semiconductor chip. The present invention also provides for the ability to concurrently burn in or electrically test each of the optical devices at elevated current and temperature.

Figure 8:
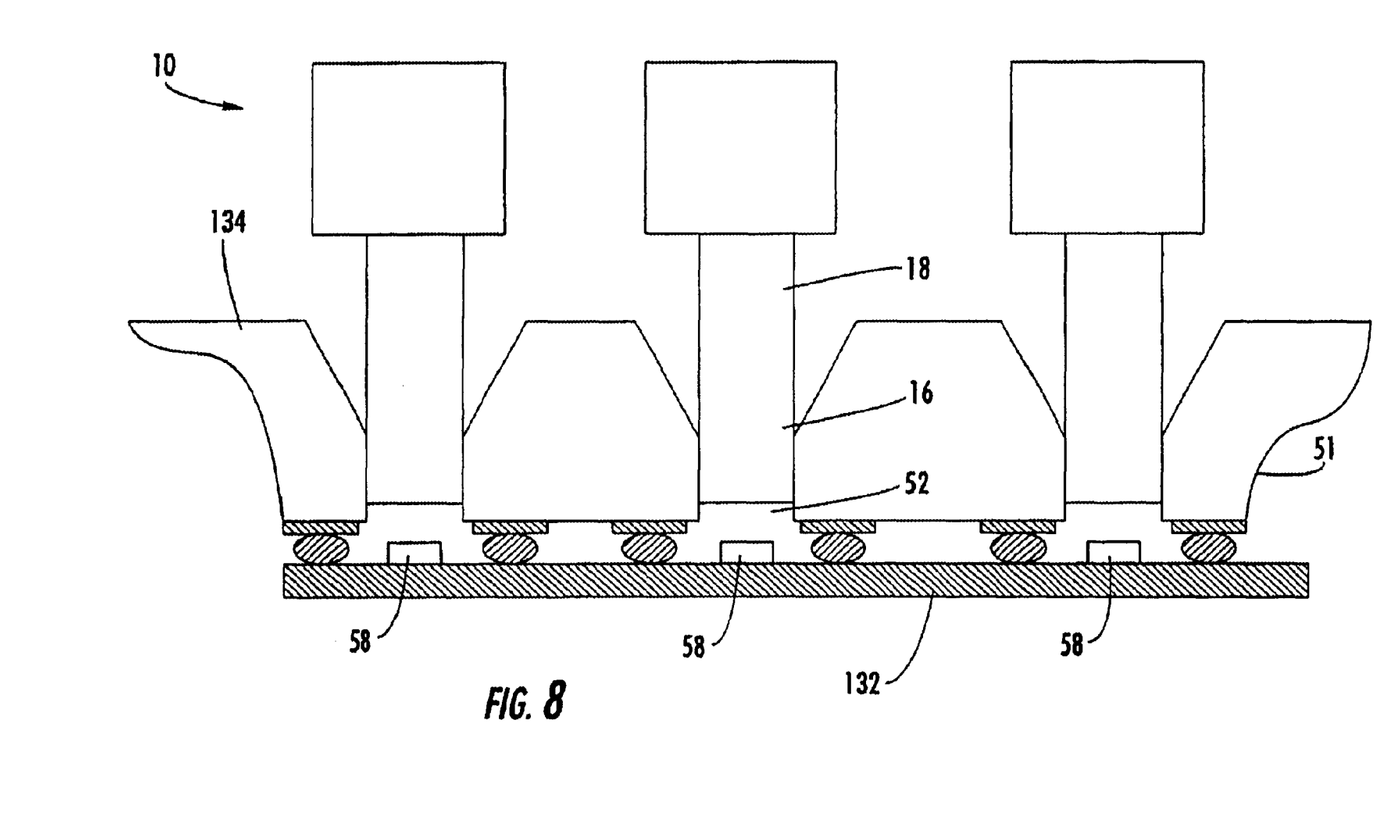
FIG. 8 is a sectional view of an optical subassembly having a plurality of guide holes having a first portion having sloped side walls and a second portion having a substantially constant cross-section for passively aligning a fiber array with an array of optical devices in accordance with a preferred embodiment of the present invention.

Referring to FIG. 8, the present invention optical subassembly 10 is particularly well suited to interface a one or two dimensional parallel array of optoelectronic devices 58 with a fiber ribbon cable. The array of optoelectronic devices is formed on a substrate 132. The array pattern preferably matches the pattern of the optical fiber array so that the center to center spacing of each adjacent optical device matches the spacing of the corresponding optical fiber. A submount 134 may be constructed to form a guide hole 52 for each of the optical devices in the array. Thus, the present invention provides for high volume production of optical subassemblies for interfacing optical fibers 18 to optical devices 58 at a relatively low cost.

Figure 3:
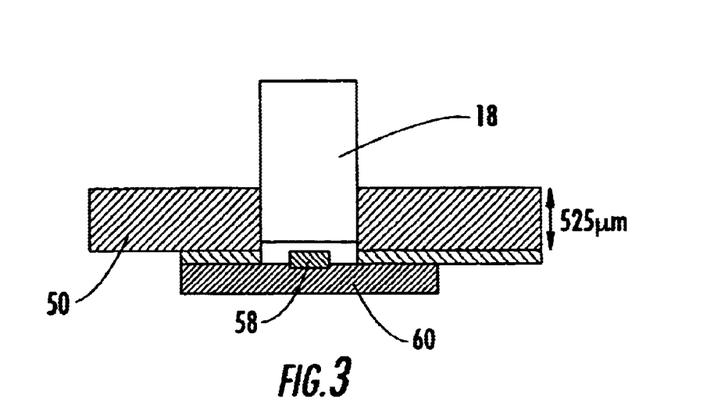
FIG. 3 is a sectional view of an optical subassembly having a guide hole formed by reactive ion etching which has a substantially constant cross-section (such as square or circular for example) with a diameter that is on the order of the outer diameter of an optical fiber.

Referring now to FIG. 3, a simplified embodiment of the present invention is shown. In this embodiment, the tapered first portion of the guide hole 52 is dispensed with and deep reactive ion etching is used to etch the guide hole into the monocrystalline silicon (Si) submount 50. As described previously, typically the guide hole is on the order of the outer diameter of the fiber 18, or typically about 125 micrometers, to minimize movement of the fiber within the guide hole, relative to the optical device. It is well-known that deep reactive ion etching of silicon can produce highaspect ratio boles in 500 micrometer thick silicon substrates with sidewall angles of less than one degree. However, in this approach, because the fiber outer diameter and guide hole diameter are so closely matched, it may be difficult to insert the fiber 18 into the guide hole.

While only the presently preferred embodiments have been described in detail, as will be apparent to those skilled in the art, modifications and improvements may be made to the system and method disclosed herein without departing from the scope of the invention. Accordingly, it is not intended that the invention be limited except by the appended claims.

What is claimed is:

1. An optical subassembly, comprising:
   a substate having an optoelectronic device and a plurality of metal pads mounted thereon;
   a submount having a guide hole with a first guiding portion and a second alignment portion, wherein the guide hole is aligned to the optoelectronic device;
   the submount including a plurality of metal pads mounted thereon, wherein each metal pad on the submount corresponds to, and is connected to one of the metal pads on the substrate; and
   an optical fiber inserted into the guide hole, wherein the first guiding portion guides the optical fiber into the hole and the second alignment portion aligns the fiber with the optoelectronic device, and wherein the optical fiber is secured within the guide hole with epoxy.

2. An optical subassembly, comprising:
   a substrate having an optoelectronic device and a plurality of metal pads mounted thereon;
   a submount having a guide hole with a first gliding portion and a second alignment portion, wherein the guide hole is aligned to the optoelectronic device, and wherein the first guiding portion has tapered sidewalls for guiding the optical fiber into the guide hole;
   the submount including a plurality of metal pads mounted thereon, wherein each metal pad on the submount corresponds to, and is connected to, one of the metal pads on the substrate; and
   an optical fiber inserted into the guide hole, wherein the first guiding portion guides the optical fiber into the hole and the second alignment portion aligns the fiber with the optoelectronic device.

3. The optical subassemnbly of claim 2, wherein the substantially constant cross section is circular.

4. The optical subassembly of claim 3, wherein the circular cross section is about the same diameter as the optical fiber.

5. The optical subassembly of claim 2, wherein the optoelectronic device is a surface emitting laser.

6. The optical subassembly of claim 5, wherein the surface emitting laser is a vertical cavity surface emitting laser.

7. The optical subassembly of claim 2, wherein the tapered sidewalls have a slope of substantially 54.7 degrees.

8. The optical subassembly of claim 2, wherein said first guiding portion has a substantially square cross section.

9. The optical subassembly of claim 2, wherein the metal pads on the submount have a protective silicon nitride layer about their perimeters.

10. The optical subassembly of claim 2, wherein the optoelectronic device is flip chip mounted to the submount.

11. The optical subassembly of claim 2, wherein the second alignment portion is of substantially constant cross section.

12. The optical subassembly of claim 2, wherein the optoelectronic device is a photodiode.

13. An optical subassembly, comprising:
    a substrate having an optoelectronic device and a plurality of metal pads mounted thereon, wherein the submount is formed from monocrystalline silicon;
    a submount having a guide bole with a fist guiding portion and a second alignment portion, wherein the guide hole is aligned to the optoelectronic device;
    the submount including a plurality of metal pads mounted thereon, wherein each metal pad on the submount corresponds to, and is connected to, one of the metal pads on the substrate; and
    an optical fiber inserted into the guide hole, wherein the first guiding portion guides the optical fiber into the hole and the second alignment portion aligns the fiber with the optoelectronic device.

14. An optical subassembly comprising:
    a substrate having an array of optoelectronic devices and a plurality of metal pads mounted thereon;
    a submount having a plurality of guide holes, each guide hole having a first guiding portion and a second alignment portion, wherein each guide hole is aligned to one of the plurality of optoelectronic devices;
    the submount including a plurality of metal pads mounted thereon, wherein each metal pad on the submount corresponds to, and is connected to, one of the metal pads on the substrate; and
    an array of optical fibers, wherein each optical fiber is inserted into one of the plurality of guide holes, wherein the first guiding portion guides the optical fiber into the hole and the second alignment portion aligns the fiber with the optoelectronic device.

15. The optical subassembly of claim 14, wherein each first guiding portion has tapered sidewalls for guiding one of the optical fibers into its corresponding guide hole.

16. The optical subassembly of claim 15, wherein said first guiding portion has a substantially square cross section.

17. The optical subassembly of claim 15, wherein the tapered sidewalls have a slope of substantially 54.7 degrees.

18. The optical subassembly of claim 14, wherein the second alignment portion is of substantially constant cross section.

19. The optical subassembly of claim 18, wherein the substantially constant cross section is circular.

20. The optical subassembly of claim 19, wherein circular cross section is about the same diameter as the optical fiber.

21. The optical subassembly of claim 14, wherein each optoelectronic device is a surface emitting laser.

22. The optical subassembly of claim 21, wherein each surface emitting laser is a vertical cavity surface emitting laser.

23. The optical subassembly of claim 14, wherein the metal pads on the submount have a protective silicon nitride layer about their perimeters.

24. The optical subassembly of claim 14, wherein the plurality of optoelectronic devices are flip chip mounted to the submount.

25. The optical subassembly of claim 14, wherein the optical fiber is secured within the guide hole with epoxy.

26. The optical subassembly of claim 14, wherein the submount is formed from monocrystalline silicon.

27. The optical subassembly of claim 14, wherein the optoelectronic device is a photodiode.

* * * * *